United States Patent
Trively

(10) Patent No.: US 7,010,333 B2
(45) Date of Patent: Mar. 7, 2006

(54) RADIOTELEPHONE TERMINAL WITH DUAL-SIDED KEYPAD APPARATUS

(75) Inventor: Martin C. Trively, Cary, NC (US)

(73) Assignee: Sony Ericsson Mobile Communications AB (SE)

(*) Notice: Subject to any disclaimer, the term of this patent is extended or adjusted under 35 U.S.C. 154(b) by 532 days.

(21) Appl. No.: 10/248,793

(22) Filed: Feb. 19, 2003

(65) Prior Publication Data

US 2004/0176047 A1 Sep. 9, 2004

(51) Int. Cl.
H04B 1/38 (2006.01)

(52) U.S. Cl. .............. 455/575.3; 455/575.1; 455/90.3; 379/433.01; 379/433.07

(58) Field of Classification Search .......... 455/575.1, 455/575.3, 90.1, 90.3, 566, 550.1, 347, 575.4; 379/433.01, 433.04, 433.07, 433.13, 434; 345/156, 168, 169; 361/778, 779, 760, 600
See application file for complete search history.

(56) References Cited

U.S. PATENT DOCUMENTS

| | | | |
|---|---|---|---|
| 5,565,658 A | | 10/1996 | Gerpheide et al. |
| 5,742,894 A | * | 4/1998 | Jambhekar et al. ...... 455/575.3 |
| 5,821,571 A | | 10/1998 | Lebby et al. |
| 5,861,875 A | | 1/1999 | Gerpheide |
| 6,038,313 A | * | 3/2000 | Collins ................. 379/433.07 |
| 6,215,993 B1 | | 4/2001 | Ulveland |
| 6,226,501 B1 | | 5/2001 | Weadon et al. |
| 6,374,088 B1 | | 4/2002 | Gustafsson |
| 6,580,932 B1 | * | 6/2003 | Finke-Anlauff ............. 455/566 |
| 6,661,404 B1 | * | 12/2003 | Sirola et al. ................ 345/168 |
| 6,760,015 B1 | * | 7/2004 | Osterg.ang.rd et al. ..... 345/169 |
| 6,785,562 B1 | * | 8/2004 | Lee et al. ................... 455/566 |
| 6,807,276 B1 | * | 10/2004 | Hirayama et al. ..... 379/433.07 |

FOREIGN PATENT DOCUMENTS

| | | |
|---|---|---|
| GB | 2348075 | 9/2000 |
| WO | WO 97/12470 | 4/1997 |
| WO | WO 98/19434 | 5/1998 |
| WO | WO 03/034697 | 4/2003 |

OTHER PUBLICATIONS

J. Sundgot, "Nokia struts new phones at NMIC", *Infosync*, Nov. 12, 2002, (at www.infosync.no/news/2002/n/2539, 2.html).

International Search Report dated May 7, 2004, Sony Ericsson Mobile Communications AB, PCT/IB2004/000038.

* cited by examiner

*Primary Examiner*—Nick Corsaro
*Assistant Examiner*—Edan Orgad
(74) *Attorney, Agent, or Firm*—Moore & Van Allen PLLC; Gregory A. Stephens

(57) ABSTRACT

Radiotelephone terminal with dual-sided keypad apparatus. A radiotelephone terminal includes a hinged flip cover with keypad apparatus that enables the receipt of tactile input on both sides of the flip. The keypad apparatus may be a single keypad that is dual-sided, and thus can receive input on either side, or the flip may be assembled with two keypads installed back-to-back within the flip. The keypads may be either of, or a combination of, non-contacting keypads or contacting keypads, and may include buttons and/or gesture areas.

5 Claims, 10 Drawing Sheets

RADIOTELEPHONE TERMINAL WITH DUAL-SIDED KEYPAD APPARATUS

BACKGROUND OF INVENTION

Telecommunication devices, such as radiotelephones, have become increasingly popular for both personal and commercial use. The increased popularity of these devices in combination with the now low cost and high function of available integrated circuit technology has caused radiotelephones to become miniaturized to facilitate storage and portability. Indeed, some contemporary radiotelephone terminal models are less than 10 centimeters in length.

As radiotelephones become smaller, less area is available for keypads, buttons, or similar input mechanisms which are used to control a radiotelephone device. These input mechanisms typically provide for data entry as well as control of any multi-media interface (MMI). For ergonomic reasons, there is a limit below which it is undesirable to decrease the size and spacing of buttons and keys, especially keys within a keypad. One solution is to require keys to perform more than one function, as in so-called "soft keys". However, the more functions assigned to multi-function keys, the more difficult and confusing a radiotelephone terminal becomes to use.

SUMMARY OF INVENTION

The present invention contemplates a radiotelephone terminal of the style that includes a hinged flip cover, also simply known as a "flip". The flip cover, according to the invention, includes keypad apparatus that can receive tactile input on both sides of the flip. When employed in a radiotelephone terminal which otherwise would have a keypad on only one side of the flip, the invention can effectively double the area for input keys.

According to some embodiments of the invention, a radiotelephone terminal comprises a housing that encloses electronic components operable to transmit and receive radiotelephone communications. These electronic components typically include a radio frequency (RF) block, baseband logic, and a processing system. The housing may also include a display. A flip cover is pivotally to the housing, for example by a hinge, and is movable between at least an open position and a closed position. The inner side of the flip cover is opposite the housing and concealed in the closed position, and the outer side of the flip cover is opposite the inner side, and exposed to a user looking at the display when the flip is in the closed position. Keypad apparatus, which may be of the non-contacting type, is disposed within the flip. The keypad apparatus has a first side and a second side and is installed in or on the flip cover so that the first side is accessible from or substantially coincident with the inner side of the flip cover and the second side is accessible from or substantially coincident with the outer side of the flip cover. "Substantially" in this context means nearly completely or completely, excluding keys and mechanical tolerances. The keypad apparatus is electrically connected to the appropriate components within the radiotelephone terminal housing so that tactile input can be received from either the first side or the second side of the keypad apparatus, thus, from either the inside or the outside of the flip cover. The keypad apparatus may be a single keypad, which is dual-sided, and thus can receive input on either side, or the flip may be assembled out of two keypads installed "back-to-back" within the flip. The keypads may be non-contacting keypads or contacting keypads where there is no keypad in the main housing. The term keypad can refer to any type of input device, including a touch sensitive area which may include predefined key positions or a gesture area. A radiotelephone terminal according to the invention is built by assembling the flip cover having the keypad apparatus disposed within, attaching the flip cover to the housing of the mobile terminal or radiotelephone, and electrically connecting the keypad apparatus to the appropriate electronic components in the housing. If the "dual-sided" flip cover is built around two keypad devices installed "back-to-back" so to speak, the two keypads are installed into the flip together with any needed mechanical supports as would be understood by those of ordinary skill in the art. Buttons or a non-contacting surface are disposed to be accessible through the surfaces of the flip, either through an aperture or individual holes through which the buttons protrude, as is typical in the art.

In order to operate a radiotelephone terminal with a flip cover as described above, it may be necessary to determine the position of the flip cover during operation and selectively enable either the inside tactile area or the outside tactile area, as the case may be. For example, it may be especially necessary to disable the outside tactile area when the flip is open. This would prevent false key presses caused by handling the radiotelephone, or pressing the radiotelephone against a surface. Selectively enabling or disabling the inside tactile area is less important, as it is effectively disabled when the flip is closed since it is concealed and inaccessible. The position of the flip cover can be detected through a small switch as is known in the art, or by a switching mechanism in the hinge. Alternatively, if a non-contacting keypad is used for the inside tactile area, the position of the flip can be determined by sensing the proximity of the housing to the inside tactile area. If a set of two keypads or a dual-sided contacting keypad is used, the outside tactile area could be disabled electrically when necessary. If a non-contacting keypad technology is used, and a double-sided keypad is used, disabling of the outside tactile area is accomplished by programmatically restricting the registration of input in certain proximity ranges, wherein the layer or layers of insulator on each side of the double-sided non-contacting keypad are different thicknesses. Note that "enabling" the inside or outside tactile area, as the case may be, may also include accounting for the different orientation of the keypad apparatus the results from having the flip cover in the open position versus the closed position. In any case, electrical and programmatic functions that are necessary to enable full use of the double-sided keypad apparatus in a flip cover as described are implemented through the processor, control logic, and any drivers which are installed within the radiotelephone terminal. These components, along with any microcode or other software form the means to receive input through the dual-sided keypad apparatus.

BRIEF DESCRIPTION OF DRAWINGS

FIG. 1 is divided into FIGS. 1A and 1B, showing the terminal with the flip cover closed, and the flip cover open, respectively.

FIG. 2 is similarly shown as FIGS. 2A and 2B to illustrate views with the flip cover closed and open, respectively.

FIG. 7 is divided into views illustrated in elevation view FIG. 7A and top plan view FIG. 7B for clarity.

DETAILED DESCRIPTION

Figure 1A:
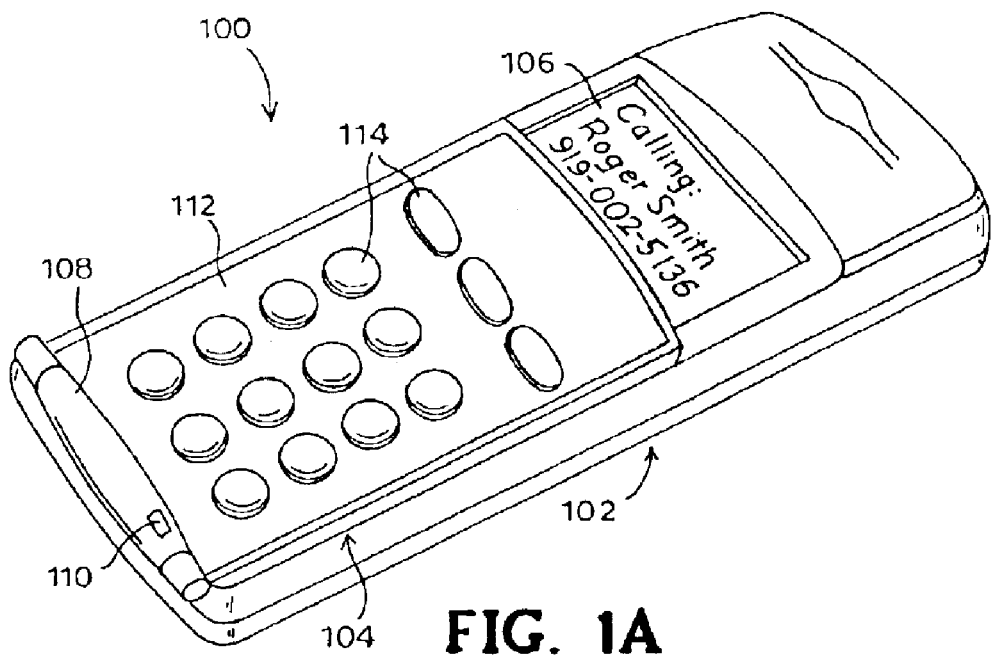
FIG. 1 shows external views of a mobile radiotelephone terminal according to an embodiment of the invention.
Figure 1B:
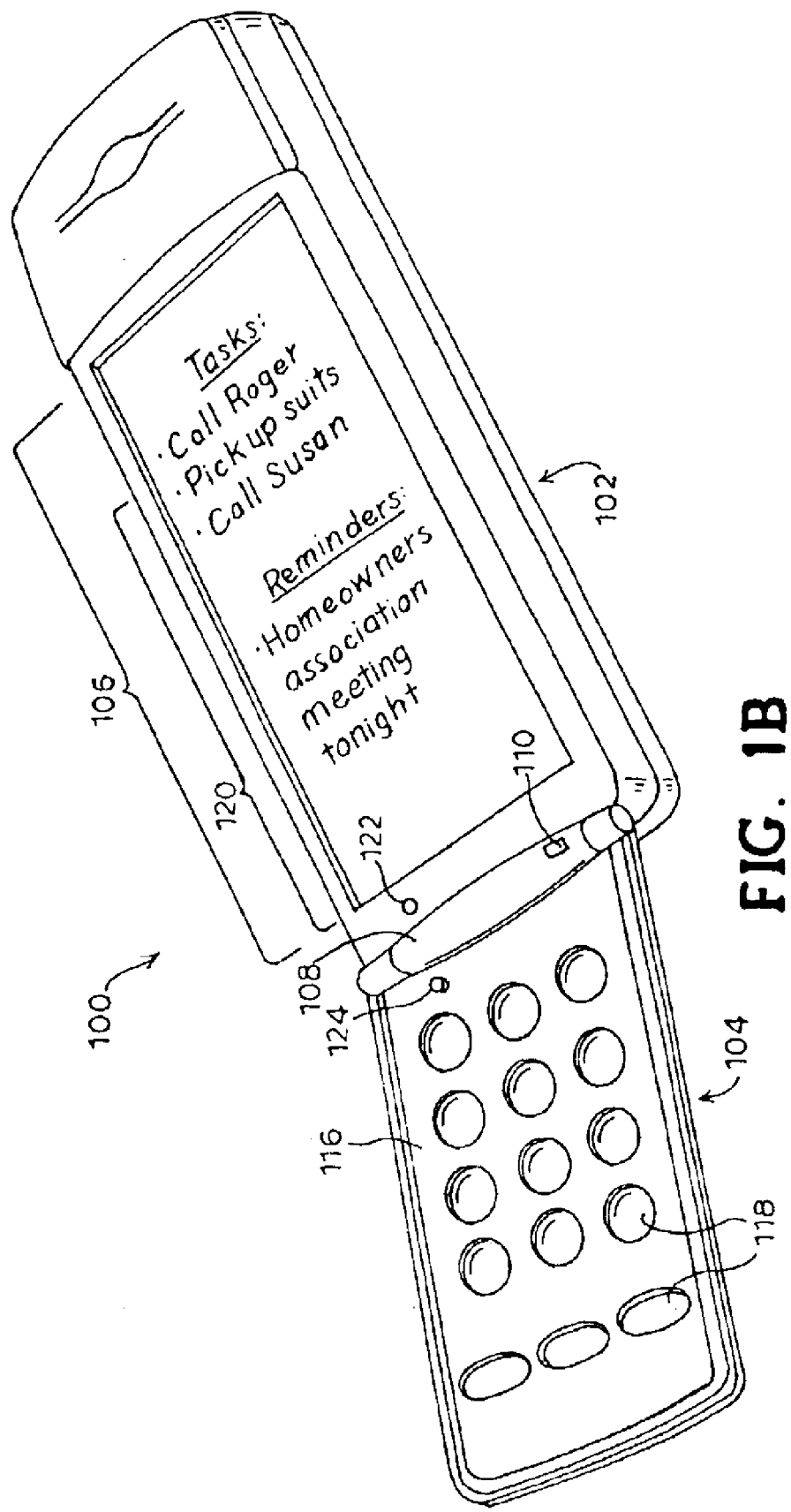

FIG. 1 illustrates an external view of one embodiment of the invention. FIG. 1 is presented as FIGS. 1A and 1B for clarity. FIG. 1A illustrates the radiotelephone device with the flip cover closed. In FIG. 1A, radiotelephone terminal 100 includes a housing, 102, and a flip cover, 104. Housing 102 contains electronic components that are operable to transmit and receive radiotelephone communication signals as is understood in the art. Housing 102 also contains components for operating an included display, 106. Additional components are responsible for other functions which are attendant to engaging in communication via radiotelephone signals, such as receiving audio, producing audio, receiving input, etc. In FIG. 1A, the flip cover is pivotally mounted to the housing via hinge 108. In this particular embodiment, the hinge includes an opening, 110, for a microphone element disposed so that sound reaches it with the flip cover in either the open or closed position. In FIG. 1A, an outer side of the flip cover is visible, coincident with a first side of a keypad apparatus as shown at 112. Input keys 114 are accessible and visible on the outer side of the flip cover. Keys 114 are embodied in an outside tactile area that can be used to provide input to the radiotelephone device. Note that display 106 is indicating that the user is currently in the process of calling one "Roger Smith" and displays his telephone number, suggesting that in this particular embodiment, the radiotelephone terminal can be in either a standby, or a calling mode with the flip cover closed.

FIG. 1B illustrates the same radiotelephone terminal discussed above, 100, with the flip cover having the dual-sided keypad apparatus now shown in the open position. Here, as throughout this disclosure, like reference numerals represent like structures throughout. With flip cover 104 in the open position, an inner side of the flip is exposed coincident with a second side of the keypad apparatus, as shown at 116. Thus, an inside tactile area is formed. The inside tactile area includes buttons 118. Display 106 is still present as shown in FIG. 1A, however, more of it is exposed. In particular, a lower area, 120, previously covered by the flip cover, is now exposed. As will be discussed later, a radiotelephone terminal according to some embodiments of the invention requires a mechanism or means for determining the position of the flip cover. In this particular embodiment, a recessed switch, 122, is shown. Actuator 124 is present on the flip cover, 104, and activates the switch when the flip cover is closed.

The radiotelephone terminal, as discussed above, can be implemented with a flip cover pivotally mounted to the housing and movable between a closed position and an open position as is already known in the art. A hinge is the method of connecting the flip cover to the housing generally described herein. Other methods of attaching a flip cover are available as is known in the art. However, the flip cover according to the invention in any case includes a dual-sided keypad apparatus. It should be noted that any type of keypad technology could be used to implement the invention. Two keypads could be installed "back-to-back" or a single, two-sided keypad can be used. Either contacting or non-contacting technology can be used.

Figure 7A:
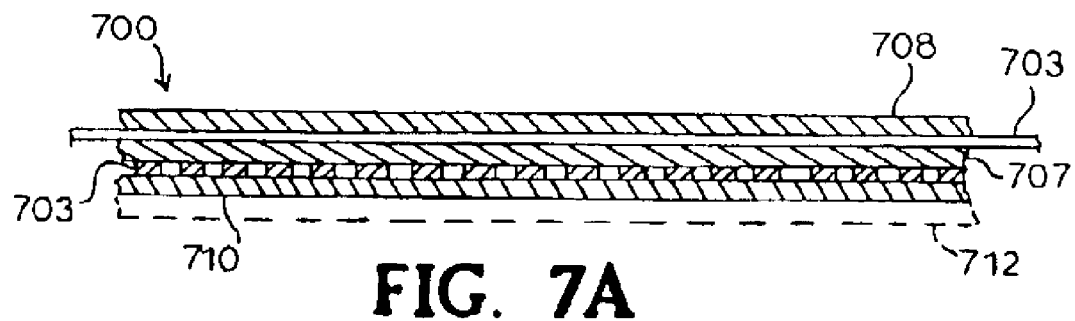
FIG. 7 illustrates the construction of another type of dual-sided keypad, which can find use with some embodiments of the invention.
Figure 7B:
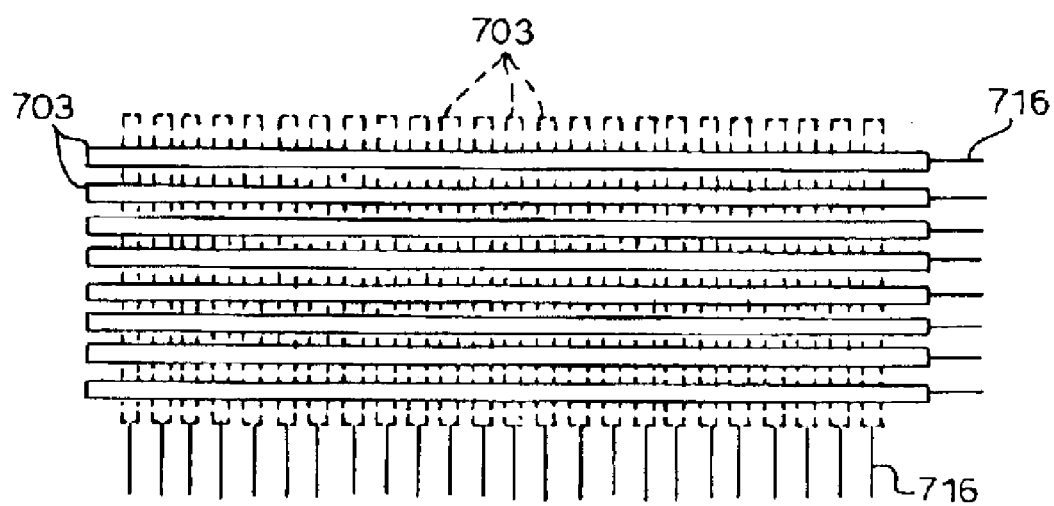

In the case of a non-contacting touchpad, according to disclosed embodiments, "buttons" as shown at 114 and 118 of FIG. 7 are silk-screened or otherwise printed on the tactile surfaces. In the case of contacting keypad technology, actual buttons are used. Typically, with contacting keypad technology, no other keypad will be present in the main housing of the radiotelephone terminal, that is, the keypad(s) in the flip will be the only keypad(s) in the terminal. It should also be noted that in order to receive input in the open position and remain mechanically stable, a robust hinge arrangement is desirable. Such robust hinges and methods of making electrical connections through such hinges are known in the art and are commonly used on terminals with a flip up earpiece. It should be noted that the term "tactile" and related terms such as "tactile input" and "tactile surface" as used herein are not meant to imply that a keypad technology is based on mechanical movement or switch closures. Even in the case where electrodes sense proximity of a conductive object, such as a finger or stylus, the term "tactile" is meant to apply. It should also be noted that the various modes with which the communication terminal can operate as associated with the position of the hinged flip cover are purely a design choice. Note that in FIG. 7B, with the flip cover open, the radiotelephone terminal goes into a personal information manager mode wherein display 106 is displaying a task list and reminders. It would be a simple matter for one of ordinary skill in the art to design a mobile terminal in which the telephone modes were enabled with the flip cover in this position.

Figure 2A:
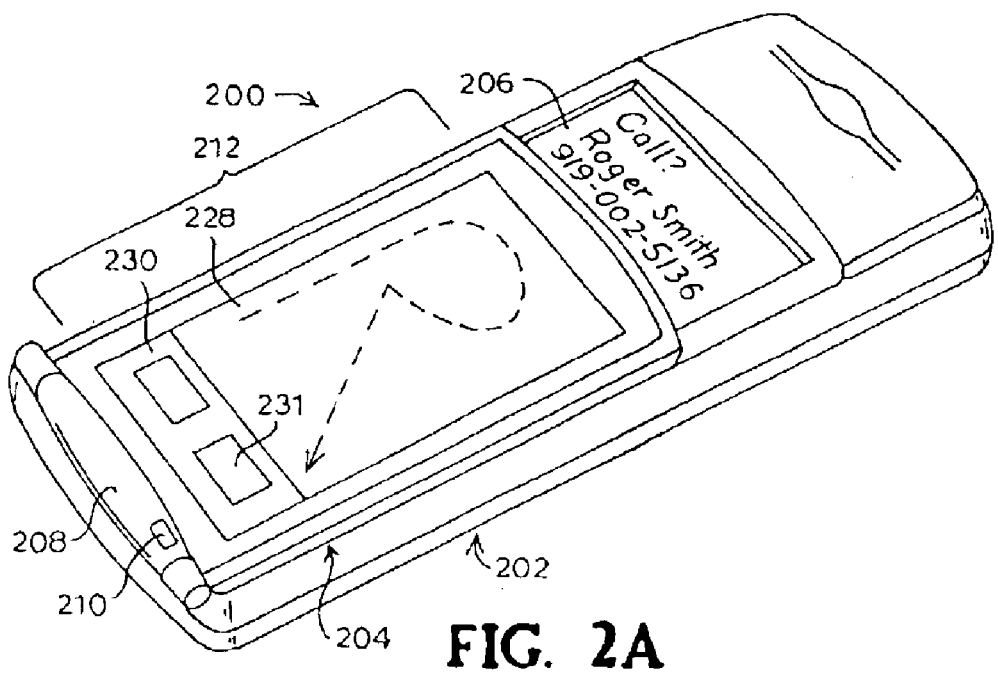
FIG. 2 illustrates an external view of a mobile radiotelephone terminal according to another embodiment of the invention.
Figure 2B:
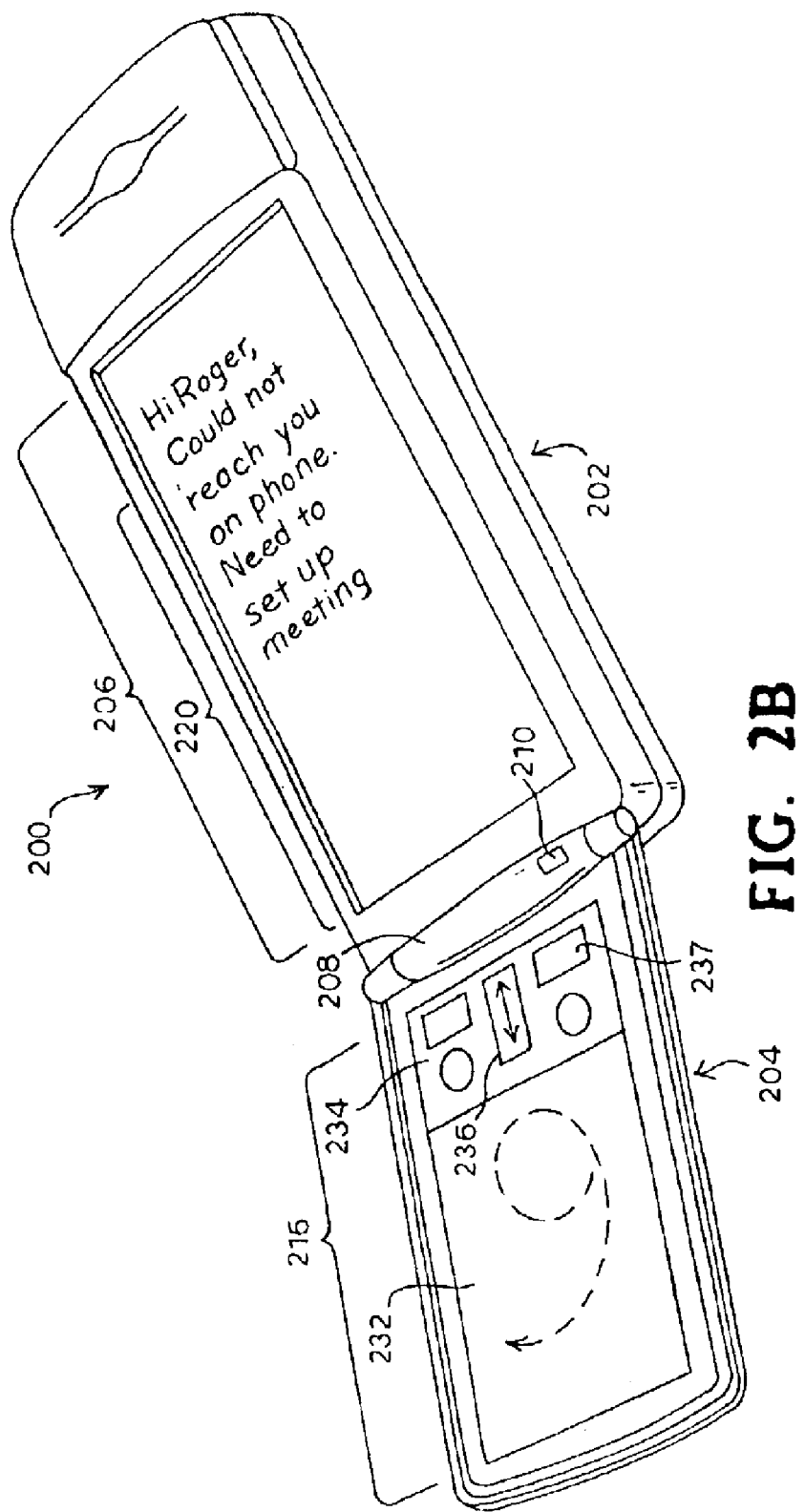

FIG. 2 illustrates an external view of a mobile radio telephone terminal according to another embodiment of the invention. FIG. 2A illustrates the terminal with the flip cover closed, and FIG. 2B illustrates the terminal with the flip cover open. In this case, the terminal uses non-contacting touchpad or similar keypad technology based on capacitive sensing of the proximity of a conductive object. In FIG. 2A, terminal 200 again includes a housing, 202, which includes the necessary electronic components for operating the terminal. Flip cover 204 is illustrated in the closed position. Display 206 is partially covered as before, and shows the terminal making a call as before. Flip cover 204 is movable via hinge 208. Again, a microphone element is disposed within opening 210, which is on the hinge for accessibility in both the open and closed positions. In this case, an outer side of the flip cover is shown coincident with the first side of the non-contacting keypad apparatus as shown as 212. The first side of the keypad apparatus and the outer side of the flip cover form an outside tactile area. This tactile area includes a "gesture area", 228 and an area, 230, with silk-screened buttons, 231. Note that gesture area 228 has been used to enter the letter R to search for the name "Roger Smith" which is currently displayed on display 206. The dotted arrowed line shown in the gesture area 228 illustrates the recent gesture. Note that the gesture area and button area in this case are both part of the touchpad that forms a portion of the keypad apparatus.

FIG. 2B illustrates terminal 200 with flip 204 in the open position. In this configuration, inside tactile area 216, which was concealed with the flip in the closed position, is now exposed. This second side of the keypad apparatus is coincident with the inner side of the flip cover and accordingly with the inside tactile area. Hinge 208, microphone opening 210, and housing 202 are visible as before. Additional area 220 of display 206 is now visible. The exposed side of the non-contacting keypad or touchpad in this configuration contains gesture area 232, and an area, 234, which contains silk screened buttons, 237, as well as a printed scrolling control, 236. The non-contacting keypad apparatus is wired through the hinge as previously described.

It should be noted that the non-contacting touchpad can be used to detect whether the flip cover is in the open position or in the closed position, eliminating the need for the separate switch illustrated in FIG. 1. In this case, the keypad would sense the proximity of the housing to the inside tactile area of the flip cover keypad apparatus. The driver or processor within the phone then programmatically understands the signals created by the proximity of the housing, and "knows" that the flip is closed. Using non-contacting technology in a terminal as discussed herein has advantages in terms of versatility. It is a simple matter for one of ordinary skill in the art to program and silkscreen appropriate functions into the phone, depending on the phone model. Different versions of mechanical keypads would not be needed. Scrolling controls such as that shown at 236 of FIG. 2B can be implemented as vertical or horizontal areas that a user pans across with a finger or stylus as opposed to a button type implementation having a discrete area for causing a scroll in a certain direction. Note that a non-contacting touchpad may or may not be mechanically marked indicating dedicated functions. With an unmarked touch area, the same dedicated function approach could be used, however, user feedback could be provided in an additional manner using audio or visual cues. Note also that the gesture area can be used for letter recognition in such a way as to allow the composing of written messages. This example is illustrated in FIG. 2B, where an Email message is being composed to Roger Smith as shown on display 206. Note the gesture area 232 shows that the "g" character, which ends the word "meeting", has just been entered. Indeed, the use of the control and data entry functions of any type of keypad apparatus disposed within the flip, whether for data input, MMI control, or a simple touchpad to make telephone calls, is completely up to the designer of the radiotelephone terminal.

Figure 3:
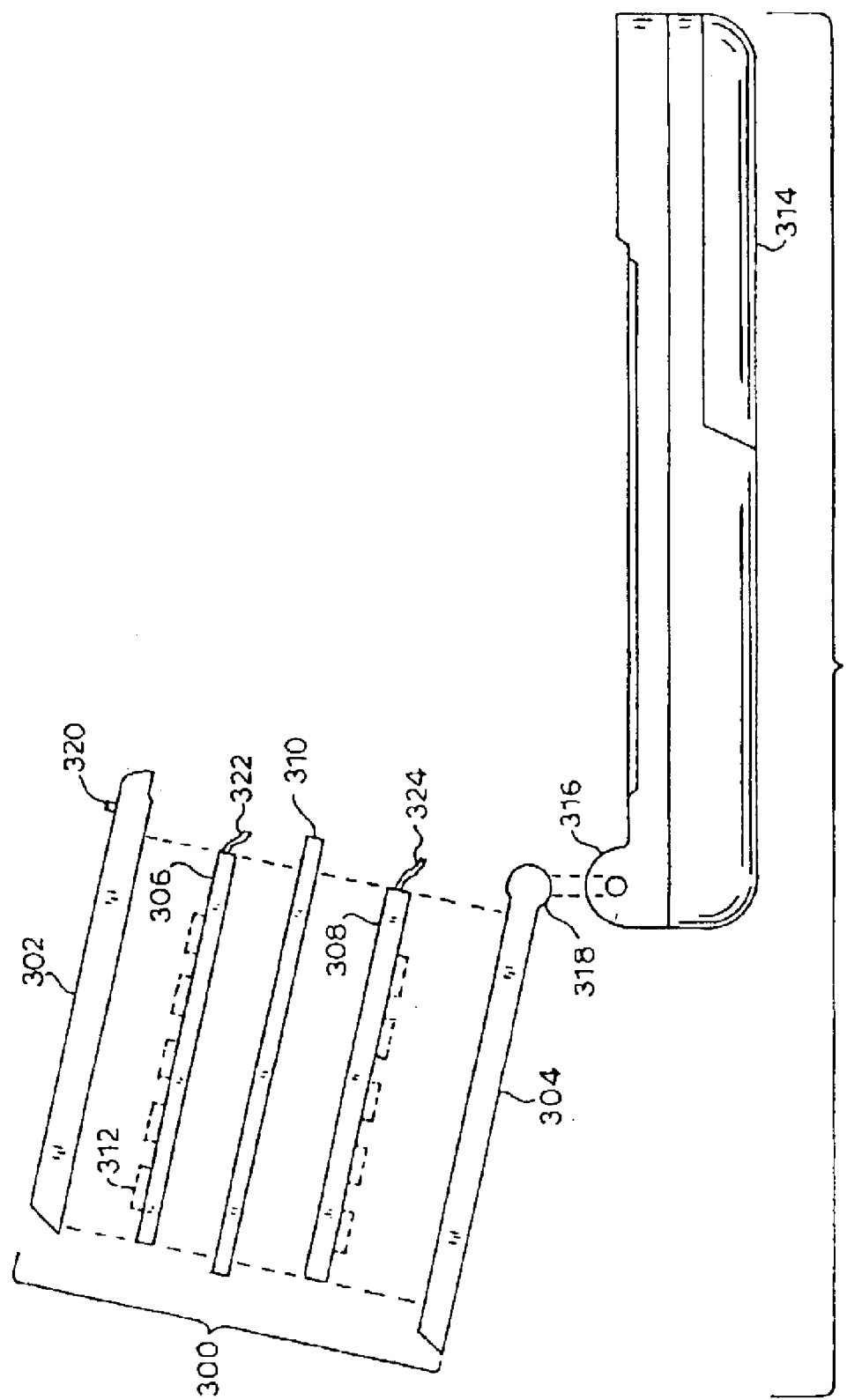
FIG. 3 illustrates how a radiotelephone terminal according to some embodiments of the invention is assembled.
Figure 4:
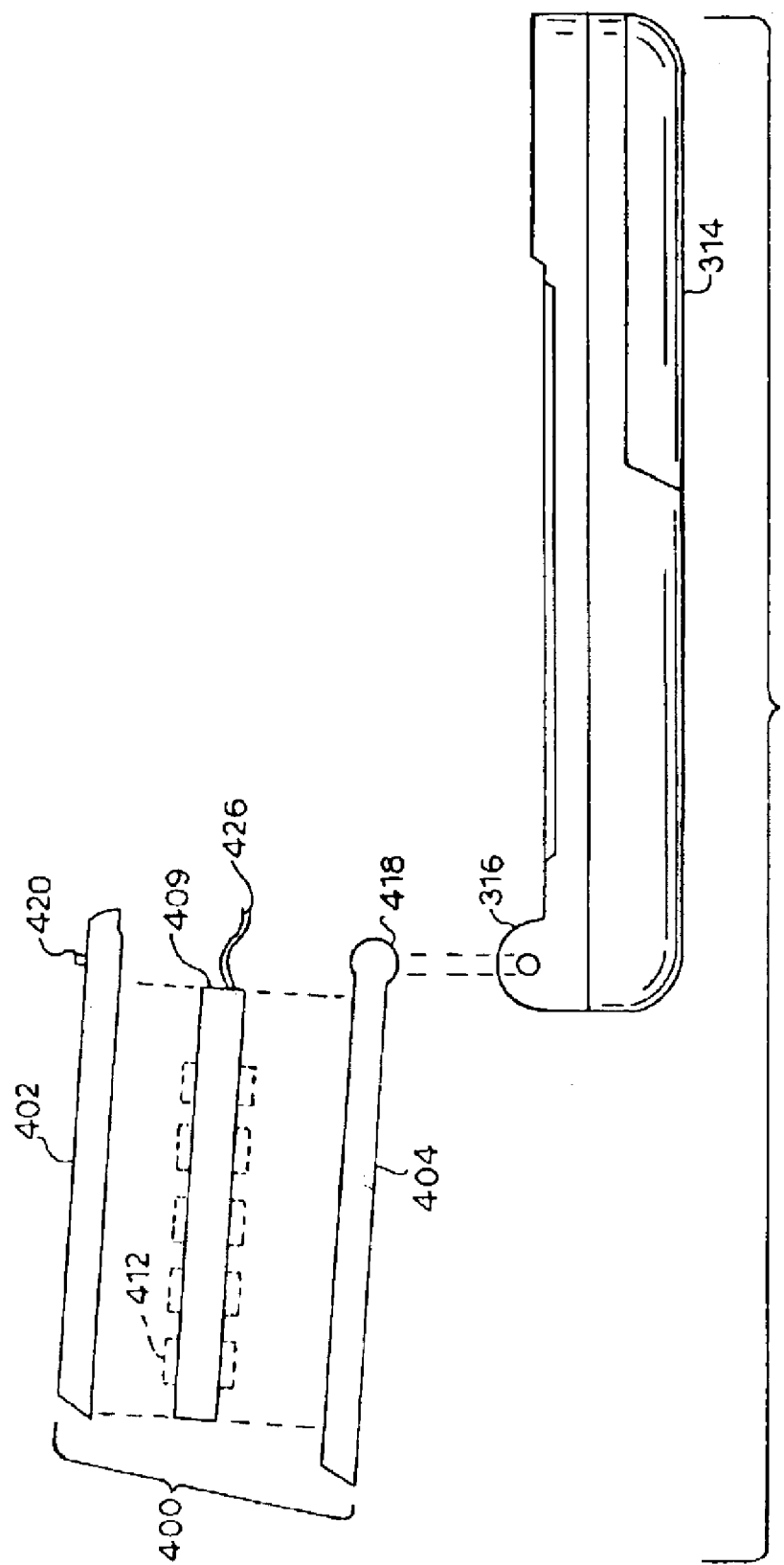
FIG. 4 illustrates how a radiotelephone terminal according to other embodiments of the invention is assembled.
Figure 5:
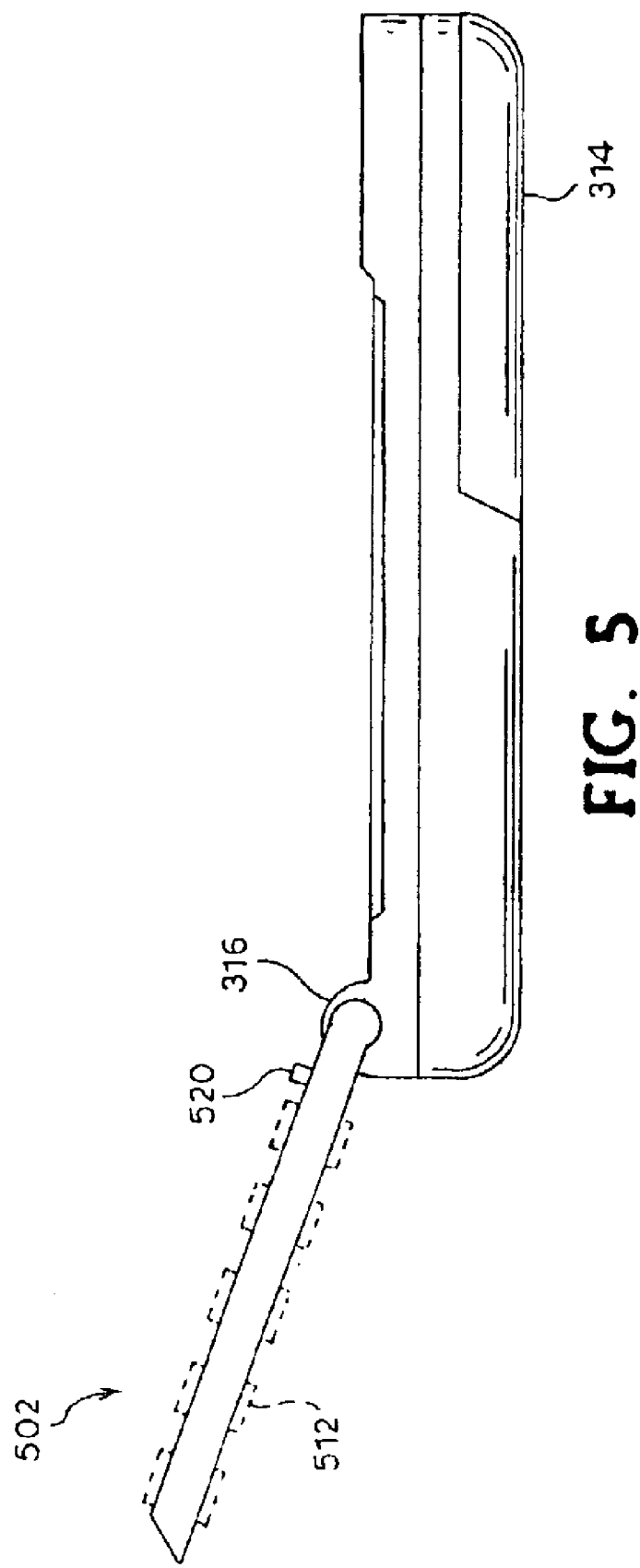
FIG. 5 is a side view of a radiotelephone terminal according to some embodiments of the invention that has been assembled according to the methods illustrated in FIGS. 3 or 4.

FIGS. 3, 4, and 5 illustrate how a radiotelephone terminal according to the invention can be assembled. FIG. 3 illustrates one embodiment. In FIG. 3, flip cover 300 is assembled out of a portion of material 302 which forms the inner side of the flip cover and a portion of material 304 which forms the outer side of the flip cover. Typically, these portions are made of molded plastic material. A keypad apparatus is formed from first and second keypads, 306 and 308, respectively, which form a first side and a second side of the keypad apparatus, respectively. These keypads are assembled back-to-back to form a dual-sided keypad apparatus disposed within the flip cover. A mechanical strengthening member, 310, may or may not be needed depending on the specific design of the radiotelephone terminal. Note that keys, 312, are shown with dotted lines. They are also shown exaggerated in size. Mechanical keys would only protrude in this manner if a contacting keypad technology was used for the invention. These protruding keys would not be present in the case of a non-contacting keypad. Once the flip cover is assembled, it is attached to the housing 314, which encloses the various electronic components that transmit and receive radiotelephone communication signals. The flip cover is hinged to the housing via a fixed portion 316 of a hinge, which is snapped together with the portion 318 of the hinge attached to the flip, which moves with the flip. Note that in this case, a protrusion, 320, is included which provides a portion of the means for detecting and determining whether the flip cover is in the open position or the closed position. If non-contacting touchpads are used, this protrusion might be omitted, as previously discussed. Finally, the keypad apparatus is electrically connected to the electronic components in the housing, 314, so that tactile input can be received, at least selectively, from both the first side and the second side of the keypad apparatus. Connecting wires or cables 322 and 324 are provided for this purpose in the embodiment of FIG. 3.

By input being received from one or both sides selectively, what is meant is that it may be that only one side or the other is enabled at any particular time or that one side is enabled or disabled at any particular time based on whether the flip cover is in the open position or the closed position. It would also be possible to design a radiotelephone terminal in which both sides were enabled at the all times, thus effectively providing for receiving input from both the first side and the second side of the keypad apparatus disposed within the flip cover in a non-selective fashion.

FIG. 4 illustrates the assembly of a terminal in a different embodiment. In FIG. 4, housing 314 and hinge portion 316 are provided as before. However, a flip cover, 400, with dual sided keypad apparatus disposed within is implemented using a single keypad having the ability to accept tactile input on both sides as shown at 409. In this case, this single keypad is enclosed in flip portions 402 and 404 which are assembled together. Keys 412 will protrude through the flip cover housing if present, or if non-contacting keypad technology is used, these keys would not be present. With either embodiment shown, a non-contacting surface is simply exposed through an aperture in the relevant portions of the flip structure. Again, once the flip cover is assembled, it is attached to the housing 314 via hinge portions 316 and 418 in a similar fashion to that previously discussed. The keypad apparatus is electrically connected to the appropriate electronic components within housing 314 via cable 426. It should be noted that with respect to both FIG. 3 and FIG. 4, connecting cables or wires may include multiple conductors for multiple circuits. Again, in FIG. 4, protrusion 420 is present to enable the detection and/or determination of the position of the flip cover when the radiotelephone terminal is in operation.

FIG. 5 illustrates the assembled phone. Housing 314 is still present of course. Hinge portion 316 is not visible in this view, but its position is indicated in the drawing. Flip cover 502 contains both inside and outside tactile areas, and is mechanically robust to support the keypad apparatus disposed within. Keys 512, shown in exaggerated size and dotted, would protrude from the flip cover, as shown here, if contacting keypad technology is used. In the case of non-contacting keypad or "touchpad" technology, these protrusions would not be visible in this view. Protrusion 520 to implement the flip cover position detection mechanism is visible in this view. Again, this protrusion would not be present if a non-contacting keypad surface was used to sense the proximity of housing 314, and programmatically determine whether the flip cover is in the open position or the closed position. It should be noted that a flip cover may have other positions as well, however, the flip cover in the specific embodiments described would have at least one closed position and at least one open position. It should also be noted that the various steps involved in assembling a radiotelephone terminal according to the invention might be performed in an order other than that illustrated here.

As previously discussed, a dual-sided keypad apparatus as contemplated by embodiments of the invention can be made from two single sided keypads. However, there may be embodiments in which it is advantageous to form the keypad apparatus out of a single, dual-sided keypad. It should again be noted that the term keypad as used herein is not meant to be limited to keypads based on contacting switch technology. Rather, a keypad according to any type of technology might be referred to as such. Keypads as contemplated by this disclosure include the non-contacting type more typically referred to as a "touchpad" in which the proximity of conductive bodies is sensed.

Figure 6:
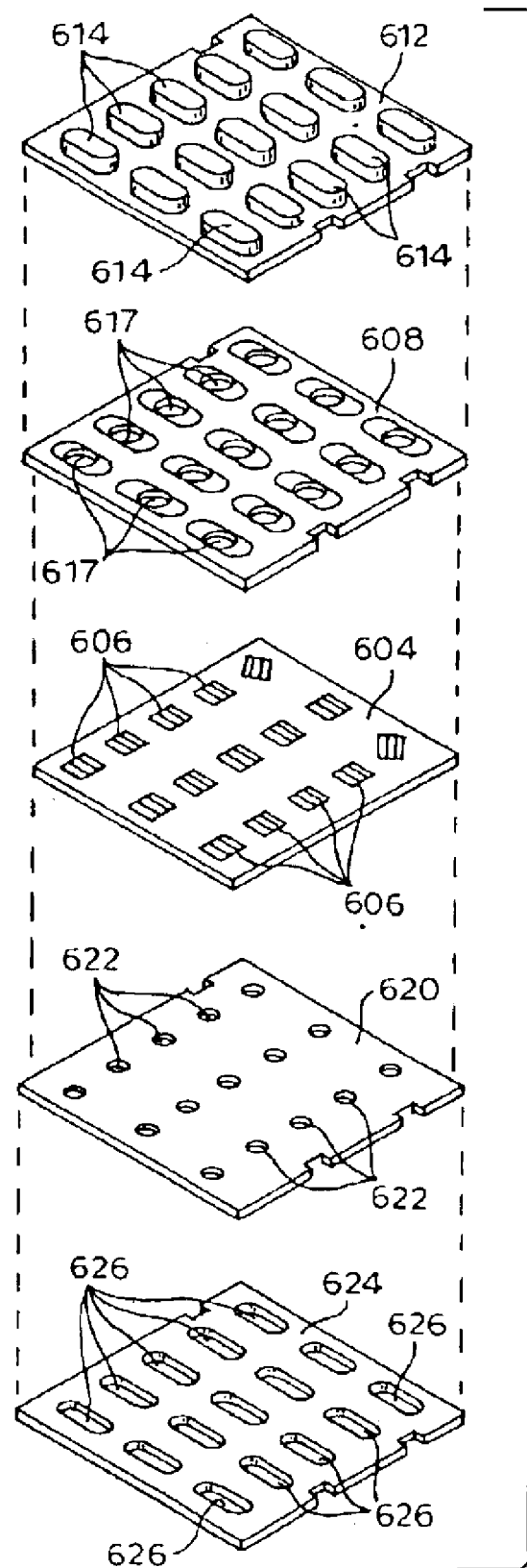
FIG. 6 illustrates the assembly of a dual-sided keypad, which might find use with certain embodiments of the invention.

FIG. 6 illustrates one way in which a dual-sided keypad can be formed. FIG. 6 represents an exploded perspective view of such a dual-sided keypad, in this case based on contacting technology and including discrete, formed buttons. Illustrated components include circuit board 604, which is the only circuit board contained in the keypad. Contact pads 606 are positioned so that a respective contact pad is positioned beneath a key. In this view, only the top surface of circuit board 604 is shown. However, a similar surface is concealed on the underside of circuit board 604. A first surface or tactile area of the dual-sided keypad is formed from polydome substrate 608 and molded key form 612. As is known to those skilled in the art, various electronic components that enable operation of a radiotelephone terminal input keypad may be mounted on circuit board 604. Polydome substrate 608 provides tactile response for keys 614 within key form 612. Keys 614 extend through the flip cover. Keys, when pressed, extend slightly down through openings 617 in polydome substrate 608 to make contact with 606, and the bottom surfaces of the keys are conductive. To aid in manufacturing, outlines of the keys are imprinted on polydome substrate 608 as shown.

The description immediately above, by itself illustrates a single keypad formed with polydome technology as is known in the art. However, FIG. 6 illustrates a modified version in which a second side is enabled through the addition of a second polydome substrate 620 with appropriate holes 622. This substrate is illustrated upside-down relative to substrate 608. Again, circuit board 604 is dual-sided. Finally, key form 624 includes keys 626 shown inverted from the keys of key form 612. Once assembled, this structure enables contacting tactile entry to be received on either side.

FIG. 7 illustrates another form of dual-sided keypad that can be assembled in order to implement embodiments of the present invention. FIG. 7 illustrates a keypad, 700, formed from so-called virtual electrodes as is known in the art. FIG. 7 includes two views shown in FIGS. 7A and 7B. In FIG. 7, flat electrode strips 703 are present on the top and bottom of an insulating separator 707. On the top surface is a thin overlay insulator 708 which prevents a sensed object approaching from the top from making electrical contact with the electrode strips. It also protects the electrode strips from corrosion and wear. Underneath the electrode strips is another thin overlay insulator 710 which performs the same function, except on the underside or second side of the electrode keypad 700, thus forming a dual-sided, non-contacting keypad. Note that the solid line components form a dual-sided, non-contacting keypad in which tactile input on either side would be sensed equally. However, additional insulator or a thicker insulator can be included on one side as shown at 712. In this way, the proximity range of an actuator touching the top side of the keypad is different than the proximity range of an actuator touching the bottom side of the keypad. This mechanism can be used to allow the radiotelephone terminal to determine, at least to some extent, which side of the keypad is being touched, so that one side, at least, can be programmatically enabled or disabled to prevent false triggers.

Turning to FIG. 7B, the view is from the top, and for clarity, the insulators are not shown. When illustrated in this manner, the electrode pad nature of the keypad is readily apparent. Electrode strips 703 are connected to appropriate electronics via wires 716. Because the electrode strips form a grid which can have x and y coordinates imparted, the position of a touch can be readily determined from the disruption in capacitance between strips at positions where the strips cross. Again, if the insulator on one side of the electrode is thinner than the other, it is known that where a close proximity is detected, a touch is being received on the side with the thinner insulation. It should be noted that in the case where the object that is touching the keypad is at a proximity approximately equal to that which results when the thicker insulator is contacted, it is theoretically not known which side the keypad is being touched. However, as previously pointed out, it is only necessary to be able to disable one side of the keypad apparatus to obtain a practical implementation. This is so because the side which is concealed when the flip cover is closed is effectively disabled and it will be known that all touches are being received on the outside tactile surface of the dual-sided keypad apparatus. Thus, it is only necessary to be able to programmatically disable the outside tactile surface when the flip cover is open.

It should pointed out that references are made immediately above, and indeed throughout this disclosure to figures and descriptions using terms such as "top", "bottom", "inside", "outside", "front", "back", "side", "inner", "outer", etc. These terms are used merely for convenience and refer only to the relative position of features as shown from the perspective of the reader, assuming an operation orientation for convenience herein.

Figure 8:
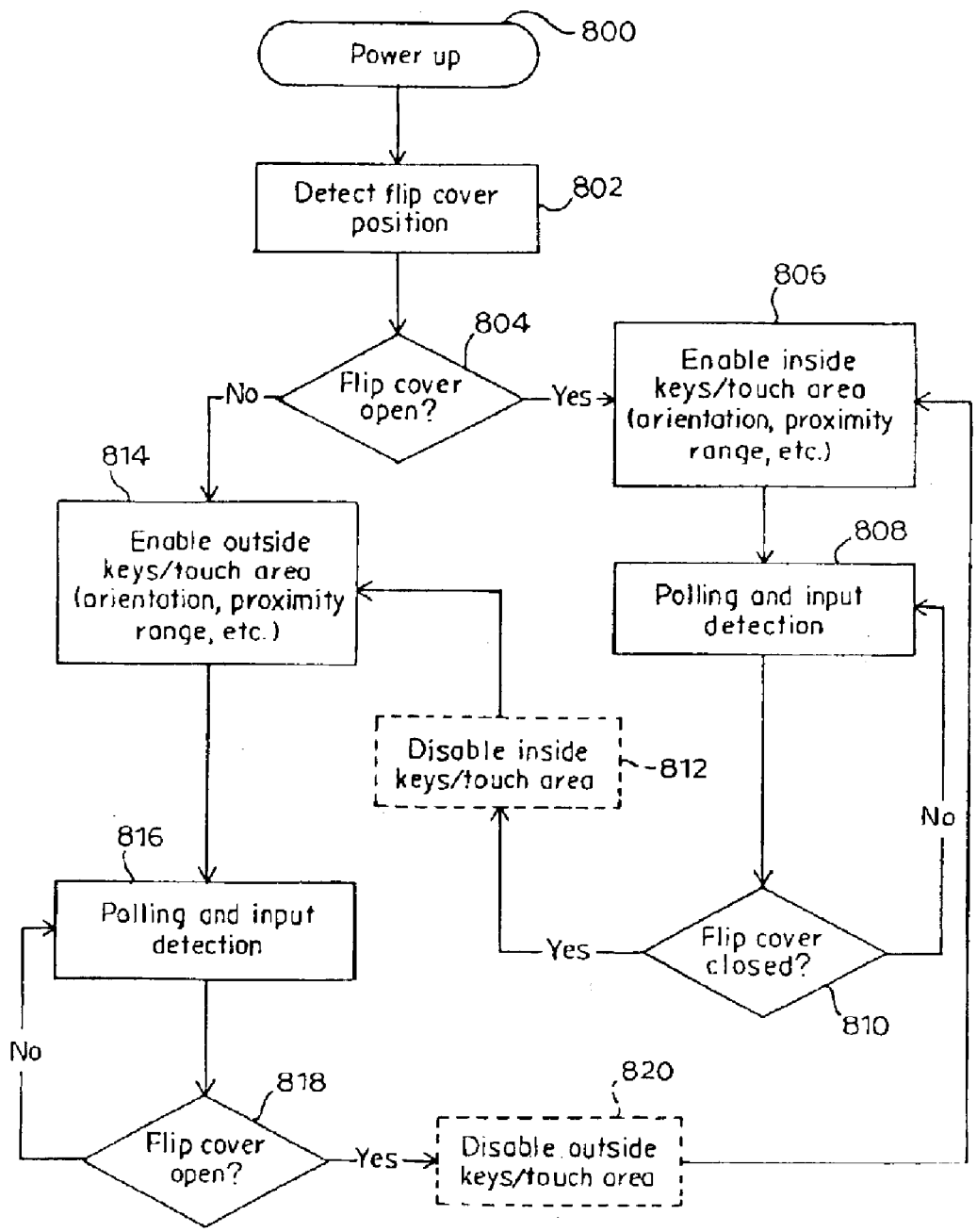
FIG. 8 is a flowchart, which illustrates the operation of a radiotelephone terminal according to some embodiments of the invention.

FIG. 8 shows a flowchart illustrating a method of operation according to some embodiments of the invention, wherein the mobile radiotelephone disables at least one side of the keypad apparatus to prevent false keypress indications. It cannot be over-emphasized that using this technique is optional. Also, both sides of the keypad may be selectively enabled as required, or only one side. At step 800 of FIG. 8, the radiotelephone terminal is initially powered up. At step 802, the flip cover position is detected using one of the mechanisms described herein, or an alternate mechanism. At step 804 a decision is made based on whether the flip cover is open or closed. If the flip cover position is determined as being open at steps 802 and 804, an inside tactile area having keys, a touch area, or some combination of those is enabled at step 806. This enablement may include programmatically accounting for orientation, proximity, or simply switching a keypad through an electrical connection. At step 808, the radiotelephone terminal begins polling and detecting input at the inside tactile area and using input received to control its operation in the normal fashion. All the while at step 810, the radiotelephone terminal is monitoring for the flip cover to be closed by the user. If the flip cover is closed, the inside tactile area is optionally disabled at step 812, and the outside tactile area is enabled at step 814. Note that step 814 is also reached at power up from step 804 if the radiotelephone terminal begins operation with the flip cover closed. Also note that the logical decision points could be reversed without altering the basic operation of the method illustrated in FIG. 8. For example, the decision point 804 could ask whether the flip cover is closed, and the decision point at 810 could ask whether the flip cover is open. Again, polling and input detection for the outside keys and/or touch area takes place at step 816. If the flip cover is then opened at step 818, the outside tactile area is optionally disabled at step 820. Processing then returns to the point where the inside tactile area is enabled at step 806. Note that in many embodiments the inside tactile area will not be disabled as shown in step 812, but the outside tactile area will be disabled as shown at 820. This is so because there is no significant risk of accidentally activating the inside tactile area with the flip cover closed, however, there is a significant risk of accidentally activating the outside tactile area with the flip cover open, by hand pressure or pressure against a surface. Thus, as previously described, where a dual-sided non-contacting keypad is used, the outside tactile area will likely be the one where a thicker insulating surface is used. Thus, objects such as a finger or stylus touching the outside tactile area never reach the closer proximity range that is detectable when they touch the inside tactile area. Therefore, this actuation proximity range difference between the inside tactile area and the outside tactile area allows selective enabling of the outside tactile area to prevent false keypresses. As previously mentioned, in the case of a dual-sided keypad or any contacting keypads, either the inside tactile area or the outside tactile area can be selectively enabled by electrically connecting and disconnecting the appropriate keypad or side of a dual-sided keypad.

Figure 9:
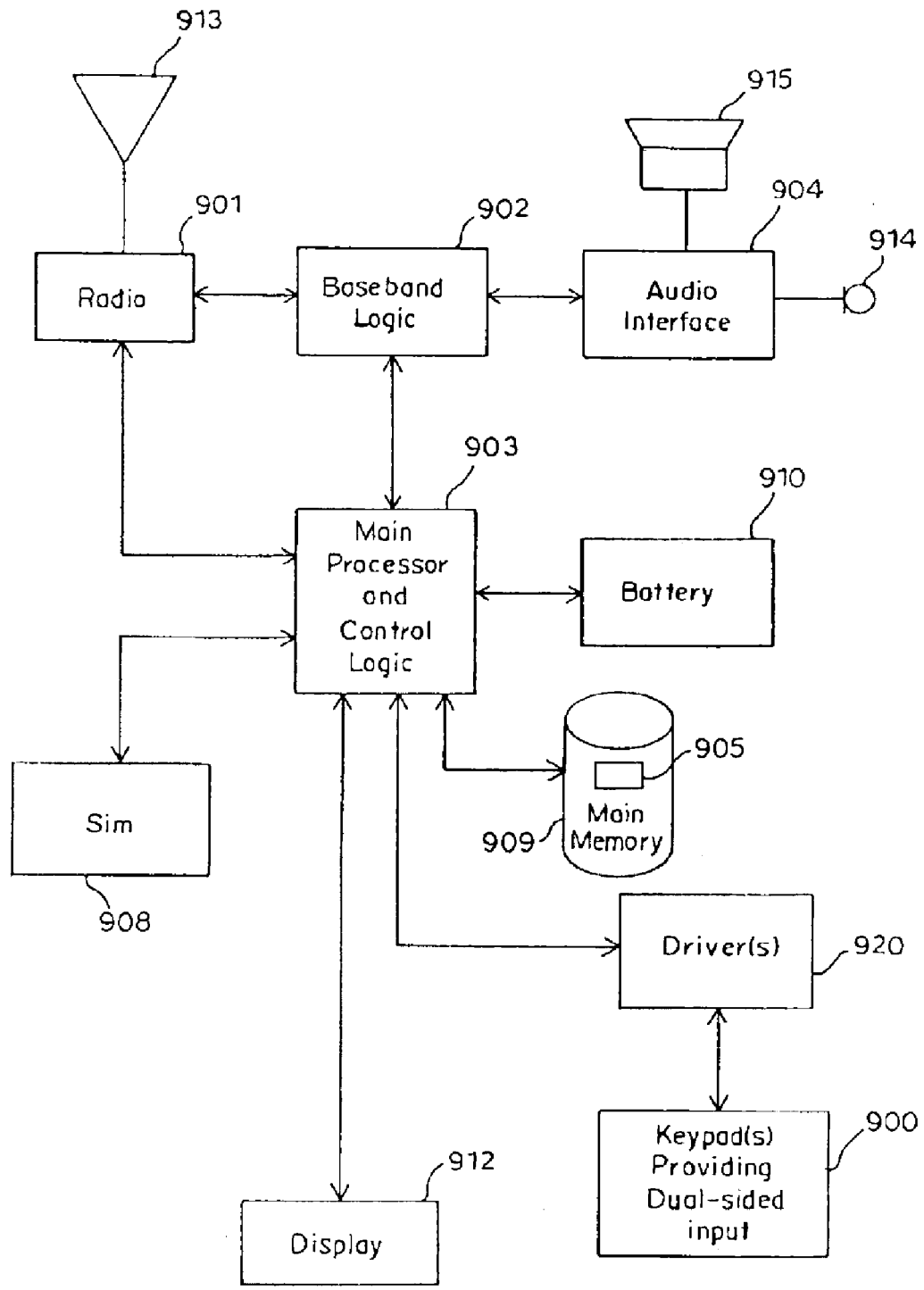
FIG. 9 is a hardware block diagram illustrating the internal architecture of a radiotelephone terminal according to some embodiments of the invention.

FIG. 9 is functional block diagram of the hardware components of a radiotelephone terminal according to some embodiments of the invention. FIG. 9 includes the components which implement the means to carry out the method described in FIG. 8, as well as receiving input through the dual-sided keypad apparatus to enable a user to make use of a radiotelephone. The keypad apparatus that is dual-sided, comprising one or more keypads, is shown at 900. It should be noted that this may not be the only keypad apparatus disposed within the radiotelephone terminal. The views shown in FIGS. 1 and 2 represent examples only. Indeed, the flip cover of a radiotelephone could include a dual-sided keypad apparatus according to the invention, and an additional, conventional single-sided keypad apparatus. Both of these can be included in block 900. In addition, the housing of the radiotelephone terminal could include an additional keypad or keypad apparatus, which can also be included in block 900. Main processor and control logic 903 controls the overall operation of the radiotelephone terminal. This is accomplished in part through computer program or microcode 905 which at times is entirely or partially stored in main memory 909. Subscriber identity module (SIM) 908 provides subscriber identity functions as understood in the art. Display 912 provides the typical display functions. The mobile terminal or radiotelephone terminal of FIG. 9 also includes a radio block 901, a baseband logic block 902, and an audio interface block 904. The terminal's antenna system, 913, is connected to the radio block 901. In the baseband logic block, 902, basic signal processing occurs, for example, synchronization, channel coding, decoding and burst formatting, as is understood in the art. Audio interface block 904 handles voice as well as analog to digital processing. It also receives input through microphone 914 and produces output through speaker 915. The functions of the aforementioned blocks are directed and controlled by the processing circuitry, some of which is included in block 903. These include microprocessors, digital signal processors (DSP"s), application specific integrated circuits (ASIC"s), and, various types of signal conditioning circuitry, buffers, etc. In particular, drivers 920 are functionally interposed between the keypad apparatus at 900 and the main processor and control logic, 903. These drivers may convert the appropriate keypad input into individual characters or other types of input as required by the main processing platform of the radiotelephone terminal. In particular, in the case of non-contacting keypad technology, drivers in the form of firmware, possibly programmed into an ASIC, provide the functional conversion between sensing the proximity of conductive objects being moved in various patterns and the appropriate character input for the radiotelephone terminal. The various functions that enable the operation of embodiments of the invention as described may be implemented partially or wholly in any combination of a main processor, a driver, the keypad apparatus itself (through electronic components installed therein) or the main memory of the radiotelephone terminal.

It should be noted that although embodiments of the present invention have been described in terms of a specific style of cellular telephone for purposes of enablement, the use of the invention, that is a mobile terminal with dual-sided keypad apparatus, is not limited to the specific embodiments described. In particular, the concept can be applied regardless of the display technology or touchpad/keypad technology being used. In addition, it would be possible to develop an embodiment in which the keypad technology used on one side of the keypad apparatus might be different than the keypad technology used on the other side. It also does not matter which functions are performed where relative to the tactile areas, the type of hinge mechanism used, or the orientation of a flip cover or other distinguishing features of the particular radiotelephone terminal involved, such as the display, discreet buttons, microphone and earpiece.

While the present invention is described herein in the context of a "cellular" style radiotelephone terminal, the term "radiotelephone terminal" may include not only a cellular radiotelephone with or without a multi-line display, but also a personal communication system (PCS) terminal which may include data processing, facsimile and data communication capabilities. The term may also encompass a personal digital assistant (PDA), Internet access devices, organizers, and global positioning system (GPS) receivers. The invention might also find use in various types of laptop or palmtop receivers that include or are included with a computer system that includes a display and full size keyboard. A radiotelephone terminal according to the invention may also be referred to as a "pervasive computing device" or the like. Additionally, some aspects of the invention are implemented by a programmed process or method. Such a process or method might be embodied in a computer program product including one stored in hardware, firmware, resident software, microcode, etc. Such a method can also be implemented by a semiconductor device that carries out some or all aspects of the method via a customized design, for example, an ASIC.

Specific embodiments of the present invention have been disclosed. One of ordinary skill in the art will readily recognize that the invention may have other applications in other environments. In fact, many embodiments and implementations are possible. The following claims are in no way intended to limit the scope of the present invention to the specific embodiments described above.

I claim:

1. A radiotelephone terminal comprising:
   a housing enclosing electronic components operable to transmit and receive radiotelephone communication signals;
   a flip cover pivotally mounted to the housing and movable between at least a closed position and an open position, and comprising an inner side and an outer side, wherein the inner side of the flip cover opposes the housing and is concealed in the closed position and the outer side of the flip cover is opposite the inner side; and
   a keypad apparatus comprising:
      at least one non-contacting keypad, the keypad apparatus having a first side and a second side, the keypad apparatus disposed within the flip cover so that the first side is substantially coincident with the inner side of the flip cover and the second side is substantially coincident with the outer side of the flip cover;
      a first set of electrode strips electrically connected to the electronic components in the housing so that tactile input can be received on the first side of the keypad apparatus;
      a second set of electrode strips electrically connected to the electronic components in the housing so that tactile input can be received on the second side of the keypad apparatus;
      an insulator separating the first and second electrode strips;
      a first overlay insulator substantially covering the first set of electrode strips; and
      a second overlay insulator substantially covering the second set of electrode strips that is thicker than the first overlay insulator such that the proximity range of an actuator touching the first side of the keypad apparatus is different from the proximity range of an actuator touching the second side of the keypad apparatus thereby determining which side of the keypad apparatus is being used.

2. The radiotelephone terminal of claim 1 wherein at least one of the first side and the second side of the keypad apparatus comprises a gesture area.

3. The radiotelephone terminal of claim 1 further comprising:
   means for determining the position of the flip cover; and
   means for enabling the inside tactile area when the flip cover is in the open position and the outside tactile area when the flip cover is in the closed position.

4. The radiotelephone terminal apparatus of claim 3 wherein the means for enabling further comprises means for selectively enabling the outside tactile area.

5. The radiotelephone terminal apparatus of claim 3 wherein the means for determining the position of the flip cover further comprises means for sensing a proximity of the housing to the inside tactile area.

* * * * *